US007961655B2

(12) United States Patent  (10) Patent No.: US 7,961,655 B2
Guo  (45) Date of Patent: Jun. 14, 2011

(54) METHOD AND APPARATUS FOR PERFORMING RADIO BEARER MAPPING IN A WIRELESS COMMUNICATIONS SYSTEM

(75) Inventor: Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 861 days.

(21) Appl. No.: 11/905,310

(22) Filed: Sep. 28, 2007

(65) Prior Publication Data

US 2008/0080403 A1 Apr. 3, 2008

Related U.S. Application Data

(60) Provisional application No. 60/848,013, filed on Sep. 29, 2006.

(51) Int. Cl.
*H04J 1/00* (2006.01)
*H04B 1/44* (2006.01)
*H04L 5/14* (2006.01)

(52) U.S. Cl. ......... 370/281; 370/282; 370/295; 370/329
(58) Field of Classification Search ....................... None
See application file for complete search history.

(56) References Cited

U.S. PATENT DOCUMENTS

| 2005/0053035 A1* | 3/2005 | Kwak et al. ............. 370/331 |
| 2006/0003787 A1* | 1/2006 | Heo et al. ............... 455/522 |
| 2006/0039326 A1* | 2/2006 | Jeong et al. ............. 370/329 |
| 2006/0062193 A1* | 3/2006 | Choi et al. ............. 370/342 |
| 2007/0275728 A1* | 11/2007 | Lohr et al. ............. 455/450 |
| 2008/0311923 A1* | 12/2008 | Petrovic et al. ............. 455/450 |

FOREIGN PATENT DOCUMENTS

| JP | 2005510950 A | 4/2005 |
| JP | 2007531350 A | 11/2007 |
| JP | 2007533276 A | 11/2007 |
| JP | 2008517492 A | 5/2008 |
| KR | 1020060051524 | 5/2006 |
| KR | 1020060092957 | 8/2006 |
| WO | 03047155 A1 | 6/2003 |
| WO | 2005006829 A2 | 1/2005 |
| WO | 2005125252 A1 | 12/2005 |
| WO | 2006036621 A1 | 4/2006 |
| WO | 2006038078 A2 | 4/2006 |

OTHER PUBLICATIONS

3GPP TSG-RAN WG2 Meeting #48, R2-052163, "RB mapping rules," Aug. 29-Sep. 2, 2005, London, United Kingdom.

(Continued)

*Primary Examiner* — Seema S Rao
*Assistant Examiner* — Christine Duong (57) ABSTRACT

A method for performing radio bearer mapping in an user equipment of a wireless communications system includes setting a plurality of multiplexing options of a frequency division duplex radio bearer, called FDD RB hereinafter, when the user equipment operates in a Cell Dedicated Channel state, each of the plurality of multiplexing options corresponding to a multiplexing mode, determining whether an RB of the user equipment has one of the plurality of multiplexing options, and using a multiplexing mode corresponding to a multiplexing option of the plurality of multiplexing options for performing RB mapping when the RB has the multiplexing option.

10 Claims, 6 Drawing Sheets

OTHER PUBLICATIONS

3GPP TS 25.331 V3.8.0 (Sep. 2001) 3rd Generation Partnership Project; Technical Specification Group Radio Access Network; RRC Protocol Specification (Release 1999), p. 239-242(in Japanese), Section 8.6.4.8, p. 267-269(in English), Section 8.6.4.8.

3G99 TS 25.331 V7.1.0 (Jun. 2006) Radio Resource Contol (RRC); Protocol Specification (Release 7).

3GPP TS 25.331 V6.3.0 (Sep. 2004) Radio Resource Control (RRC); Protocol Specification (Release 6).

Motorola: "Radio bearer mapping for SRBs", 3GPP TSG-RAN WG2 Meeting #52, Tdoc R2-061679, May 8-12, 2006, XP050131545, Shanghai, China.

* cited by examiner

METHOD AND APPARATUS FOR PERFORMING RADIO BEARER MAPPING IN A WIRELESS COMMUNICATIONS SYSTEM

CROSS REFERENCE TO RELATED APPLICATIONS

This application claims the benefit of U.S. Provisional Application No. 60/848,013, filed on Sep. 29, 2006 and entitled "Method and apparatus for Radio Bearer mapping in a wireless communication system," the contents of which are incorporated herein by reference.

BACKGROUND OF THE INVENTION

1. Field of the Invention

The present invention relates to a method and apparatus for performing radio bearer mapping in a wireless communications system, and more particularly to a method and apparatus for ensuring that an user equipment of the wireless communications system uses a proper multiplexing mode, so as to enhance transmission efficiency.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

For the universal mobile telecommunications system (UMTS), the 3G communications system comprises User Equipment (UE), the UMTS Terrestrial Radio Access Network (UTRAN), and the Core Network (CN). Communications protocols utilized include Access Stratum (AS) and Non-Access Stratum (NAS). AS comprises various sub-layers for different functions, including Radio Resource Control (RRC), Radio Link Control (RLC), Media Access Control (MAC), Packet Data Convergence Protocol (PDCP), and Broadcast/Multicast Control (BMC). The sub-layers mentioned, and their operating principles, are well known in the art, and detailed description thereof is omitted. RRC is a Layer 3 communications protocol, and is the core of the AS communications protocol. All radio resource information exchange, radio resource configuration control, QoS control, channel transmission format configuration control, packet segmentation/concatenation processing and control, and NAS protocol transmission processing is performed by the RRC layer.

The RRC layer is located in the Radio Network Controller (RNC) of the UTRAN and the UE, and is primarily used to manage and maintain packet switching and sequencing of a Uu Interface. The RRC layer performs radio resource control in the following manner. After the RRC of the UE obtains various measurement results from the MAC and the Physical Layer, the RRC generates a Measurement Report from the various measurement results. After processing by the RLC, the MAC, and the Physical Layer, the Measurement Report is sent to the RRC of a network, e.g. UTRAN. After a Radio Resource Assignment message sent from the RRC of the network is received, the RRC of the user equipment can perform lower layer control and setting based on a result of resolving the message, e.g. setting the operation mode, packet length, and encryption method of the RLC layer, setting the channel multiplexing mapping method and channel transmission format of the MAC, and setting the operating frequency, spreading code, transmission power, synchronization method, and measurement items of the Physical Layer.

Between the user equipment and the network, the RRC layer uses RRC Messages, also known as signaling, to exchange information. RRC Messages are formed from many Information Elements (IE) used for embedding necessary information for setting, changing, or releasing protocol entities of Layer 2 (RLC, MAC) and Layer 1 (Physical Layer), thereby establishing, reconfiguring, or releasing information exchange channels to perform data packet transportation. Through RRC Messages, the RRC layer can embed control signals needed by an upper layer in the RRC Message, which can be sent between the NAS of the user equipment and the CN through the radio interface to complete the required procedures.

From the standpoint of the RRC, all logical data communication exchange channels, be they for providing data transmission exchange to the user or for providing RRC layer control signal transmission exchange, are defined in the context of a Radio Bearer (RB). In the user end, the RB comprises one unidirectional or a pair of uplink/downlink (UL/DL) logic data transmission exchange channels. In the network, the RB comprises one unidirectional or a pair of uplink/downlink logic data transmission exchange channels.

In order to enhance transmission efficiency, the RRC layer of the UE can select appropriate multiplexing options according to the IE "RB mapping info" provided by the network, so as to determine statuses of UL/DL transport channels. When the UE operating in a CELL_DCH (Cell Dedicated Channel) state conforms to specified rules (e.g. when the UE receives the IE "RB mapping info", when specified transport channels are added or deleted, when the UE performs a cell reselection or a state transition, or when the UE releases an RB), the UE shall set the multiplexing option of a frequency-division-duplex (FDD) RB according to a multiplexing option selection process 10 of the prior art shown in FIG. 1. The multiplexing option selection process 10 comprises the following steps, where DCH, HS-DSCH, E-DCH, and DSCH mean Dedicated Channel, High Speed Downlink Shared Channel, Enhanced Dedicated Transport Channel, and Downlink Shared Channel.

Figure 1:
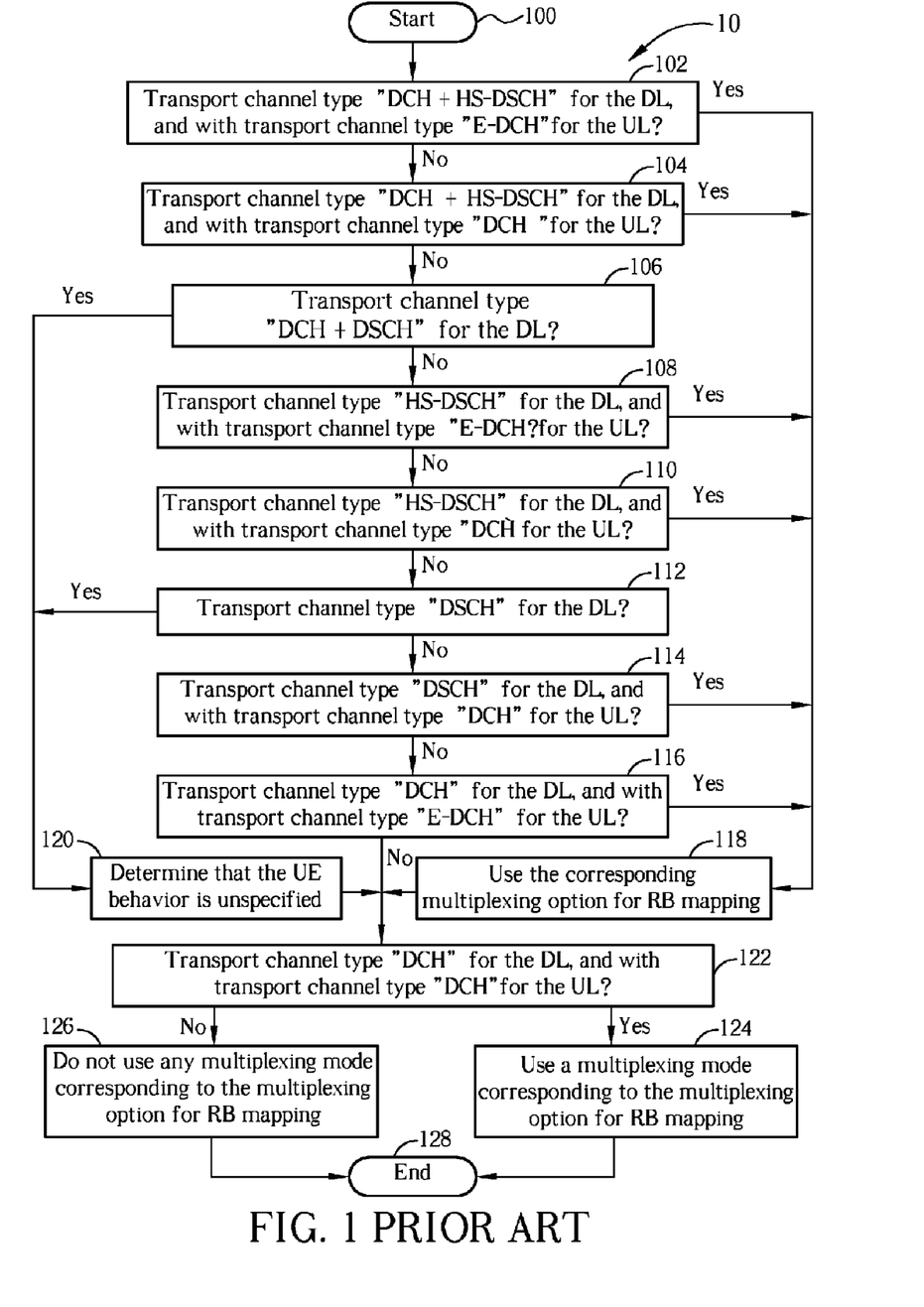
FIG. 1 is a schematic diagram of a multiplexing option selection process according to the prior art.

Step 100: Start.

Step 102: Determine whether the FDD RB has a multiplexing option with transport channel type "DCH+HS-DSCH" for the DL, and with transport channel type "E-DCH" for the UL. If true, go to Step 118; else, go to Step 104.

Step 104: Determine whether the FDD RB has a multiplexing option with transport channel type "DCH+HS-DSCH" for the DL, and with transport channel type "DCH" for the UL. If true, go to Step 118; else, go to Step 106.

Step 106: Determine whether the FDD RB has a multiplexing option with transport channel type "DCH+DSCH" for the DL. If true, go to Step 120; else, go to Step 108.

Step 108: Determine whether the FDD RB has a multiplexing option with transport channel type "HS-DSCH" for the DL, and with transport channel type "E-DCH" for the UL. If true, go to Step 118; else, go to Step 110.

Step 110: Determine whether the FDD RB has a multiplexing option with transport channel type "HS-DSCH" for the DL, and with transport channel type "DCH" for the UL. If true, go to Step 118; else, go to Step 112.

Step 112: Determine whether the FDD RB has a multiplexing option with transport channel type "DSCH" for the DL. If true, go to Step 120; else, go to Step 114.

Step 114: Determine whether the FDD RB has a multiplexing option with transport channel type "DSCH" for the DL, and with transport channel type "DCH" for the UL. If true, go to Step 118; else, go to Step 116.

Step 116: Determine whether the FDD RB has a multiplexing option with transport channel type "DCH" for the DL, and with transport channel type "E-DCH" for the UL. If true, go to Step 118; else, go to Step 122.

Step 118: Use the corresponding multiplexing option for RB mapping, and go to Step 122.

Step 120: Determine that the UE behavior is unspecified, and go to Step 122.

Step 122: Determine whether the FDD RB has a multiplexing option with transport channel type "DCH" for the DL, and with transport channel type "DCH" for the UL. If true, go to Step 124; else, go to Step 126.

Step 124: Use the multiplexing mode corresponding to the multiplexing option for RB mapping.

Step 126: Do not use the multiplexing mode corresponding to the multiplexing option for RB mapping.

Step 128: End.

Therefore, the multiplexing option selection process 10 must undergo Step 122, whether the FDD RB conforms to one of the multiplexing options mentioned in Steps 102 to 116 or not. That is, the UE must determine if the FDD RB has a multiplexing option with transport channel type "DCH" for the DL and UL. Meanwhile, when the FDD RB has the multiplexing option with transport channel type "DCH" for the DL and UL, the UE uses the multiplexing mode corresponding to the multiplexing option for RB mapping; when the FDD RB does not have the multiplexing option with transport channel type "DCH" for the DL and UL, the UE does not use the multiplexing mode corresponding to the multiplexing option for RB mapping. In other words, the UE must check the conditions of Step 122 to select the multiplexing mode. In such a situation, the UE can only use the low data rate transport channel corresponding to Step 122 for RB mapping even if there are other multiplexing options with higher data rate transport channels available. Therefore, the steps before Step 122 become redundant and invalid, and the UE cannot reach a proper transmission rate.

In short, since the multiplexing option selection process 10 must undergo Step 122, the UE cannot use multiplexing modes corresponding to Steps Step 102 to 116 when the FDD RB has a multiplexing option with transport channel type "DCH" for the DL and UL, leading to low transmission efficiency.

SUMMARY OF THE INVENTION

According to the present invention, a method for performing radio bearer mapping in an user equipment of a wireless communications system comprises setting a plurality of multiplexing options of a frequency division duplex radio bearer, called FDD RB hereinafter, when the user equipment operates in a Cell Dedicated Channel state, each of the plurality of multiplexing options corresponding to a multiplexing mode, determining whether an RB of the user equipment has one of the plurality of multiplexing options, and using a multiplexing mode corresponding to a multiplexing option of the plurality of multiplexing options for performing RB mapping when the RB has the multiplexing option.

According to the present invention, a communications device of a wireless communications system utilized for accurately performing radio bearer mapping comprises a control circuit for realizing functions of the communications device, a central processing unit installed in the control circuit for executing a program code to operate the control circuit, and a memory coupled to the central processing unit for storing the program code. The program code comprises code for setting a plurality of multiplexing options of a frequency division duplex radio bearer, called FDD RB hereinafter, when the communications device operates in a Cell Dedicated Channel state, called CEL_DCH state hereinafter, each of the plurality of multiplexing options corresponding to a multiplexing mode, code for determining whether an RB of the communications device has one of the plurality of multiplexing options, and code for using a multiplexing mode corresponding to a multiplexing option of the plurality of multiplexing options for performing RB mapping when the RB has the multiplexing option.

According to the embodiment of the present invention, a method for determining a multiplexing mode of a radio bearer in an user equipment of a wireless communications system comprises determining whether the radio bearer, called RB hereinafter, has a second multiplexing option only when the RB does not have a first multiplexing option, when the user equipment operates in a Cell Dedicated Channel state, and determining a multiplexing mode of the RB according to a determination result of the second multiplexing option. The first multiplexing option is a multiplexing option with a transport channel type "Dedicated Channel" for the downlink, and with a transport channel type "Enhanced Dedicated Transport Channel" for the uplink, and the second multiplexing option is a multiplexing option with a transport channel type "Dedicated Channel" for the downlink, and with a transport channel type "Dedicated Channel" for the uplink.

According to the embodiment of the present invention, a communications device of a wireless communications system utilized for accurately determining a multiplexing mode of a radio bearer comprises a control circuit for realizing functions of the communications device, a central processing unit installed in the control circuit for executing a program code to operate the control circuit, and a memory coupled to the central processing unit for storing the program code. The program code comprises code for determining whether the radio bearer, called RB hereinafter, has a second multiplexing option only when the RB does not have a first multiplexing option, when the communications device operates in a Cell Dedicated Channel state, and code for determining a multiplexing mode of the RB according to a determination result of the second multiplexing option. The first multiplexing option is a multiplexing option with a transport channel type "Dedicated Channel" for the downlink, and with a transport channel type "Enhanced Dedicated Transport Channel" for the uplink, and the second multiplexing option is a multiplexing option with a transport channel type "Dedicated Channel" for the downlink, and with a transport channel type "Dedicated Channel" for the uplink. These and other objectives of the present invention will no doubt become obvious to those of ordinary skill in the art after reading the following detailed description of the preferred embodiment that is illustrated in the various figures and drawings.

DETAILED DESCRIPTION

Figure 2:
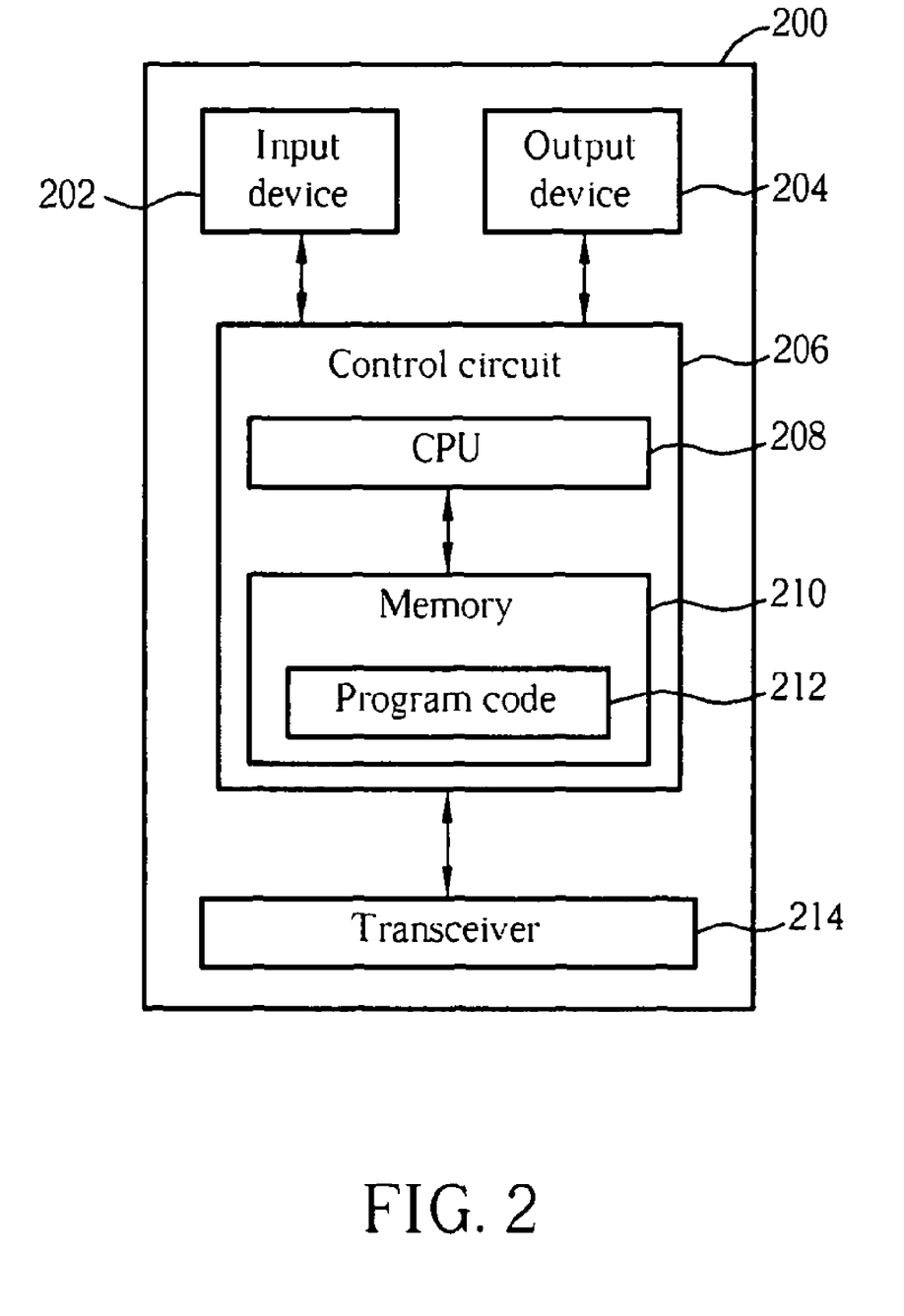
FIG. 2 is a functional block diagram of a communications device.

Please refer to FIG. 2, which is a functional block diagram of a communications device 200. For the sake of brevity, FIG. 2 only shows an input device 202, an output device 204, a control circuit 206, a central processing unit (CPU) 208, a memory 210, a program code 212, and a transceiver 214 of the communications device 200. In the communications device 200, the control circuit 206 executes the program code 212 in the memory 210 through the CPU 208, thereby controlling an operation of the communications device 200. The communications device 200 can receive signals input by a user through the input device 202, such as a keyboard, and can output images and sounds through the output device 204, such as a monitor or speakers. The transceiver 214 is used to receive and transmit wireless signals, delivering received signals to the control circuit 206, and outputting signals generated by the control circuit 206 wirelessly. From a perspective of a communications protocol framework, the transceiver 214 can be seen as a portion of Layer 1, and the control circuit 206 can be utilized to realize functions of Layer 2 and Layer 3.

Figure 3:
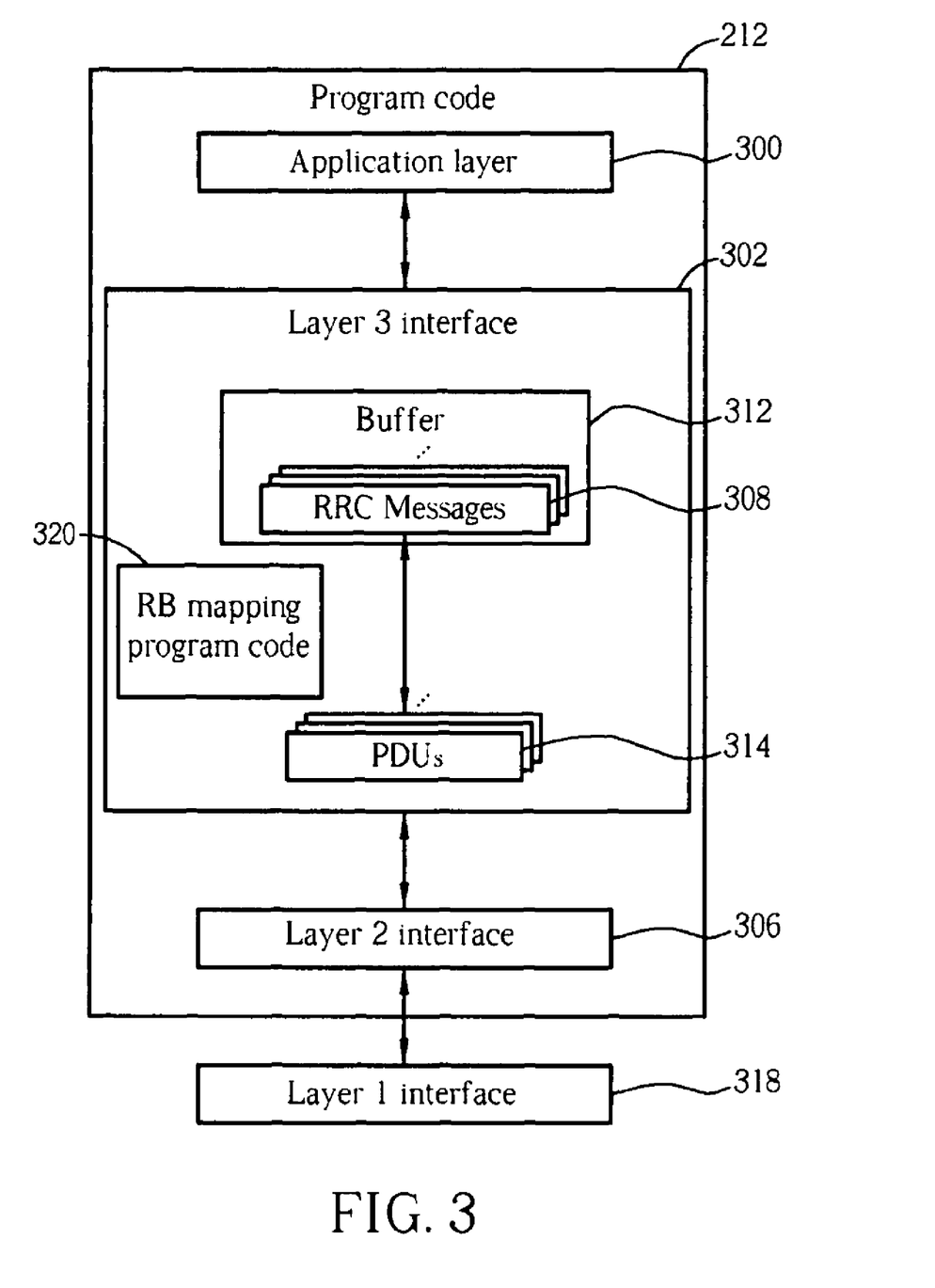
FIG. 3 is a diagram of the program code shown in FIG. 2.

Please continue to refer to FIG. 3. FIG. 3 is a diagram of the program code 212 shown in FIG. 2. The program code 212 comprises an application layer 300, a Layer 3 interface 302, and a Layer 2 interface 306, and is coupled to a Layer 1 interface 318. The Layer 3 interface 302 comprises a buffer for storing an RRC message 308, and for forming an RRC PDU 314 according to the RRC message 308. The application layer 300 provides control signals required by necessary procedures, which can be outputted by attaching the control signals to RRC PDUs 314 for setting, modifying, or releasing the Layer 2 interface 306 and the Layer 1 interface 318, to establish, modify, or cancel data exchange channels.

In order to enhance transmission efficiency, the Layer 3 interface 302 can select appropriate multiplexing options according to the IE "RB mapping info" provided by the network, so as to determine statuses of UL/DL transport channels. In such a situation, the embodiment of the present invention provides an RB mapping program code 320 for accurately perform RB mapping, so as to prevent waste of radio resources.

Figure 4:
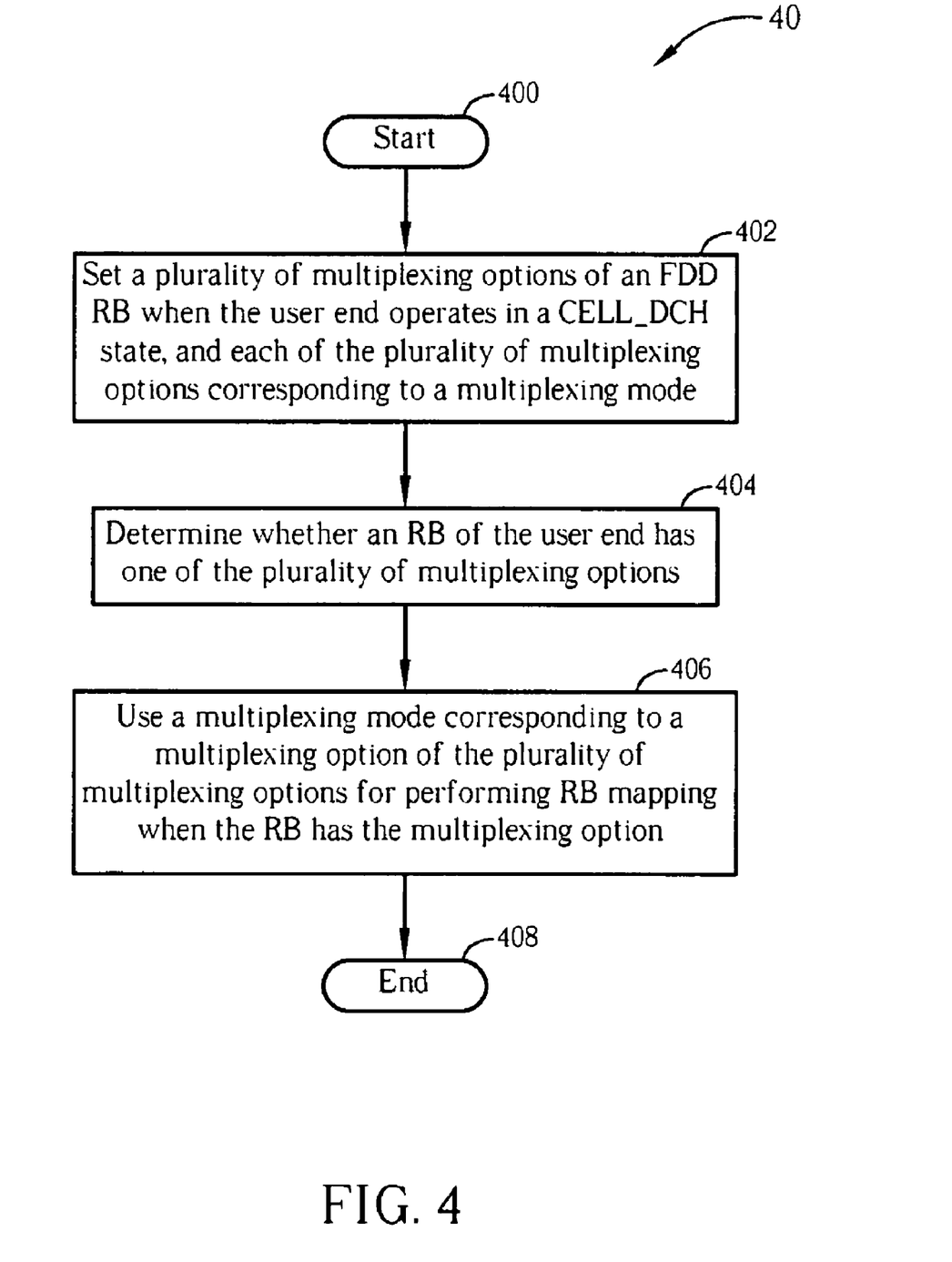
FIG. 4 is a flowchart diagram of a process according to an embodiment of the present invention.

Please refer to FIG. 4, which illustrates a schematic diagram of a process 40 in accordance with an embodiment of the present invention. The process 40 is utilized for performing RB mapping in a user equipment of a wireless communications system, and can be compiled into the RB mapping program code 320. The process 40 comprises the following steps:

Step 400: Start.
Step 402: Set a plurality of multiplexing options of an FDD RB when the user equipment operates in a CELL_DCH state, and each of the plurality of multiplexing options corresponding to a multiplexing mode.
Step 404: Determine whether an RB of the user equipment has one of the plurality of multiplexing options.
Step 406: Use a multiplexing mode corresponding to a multiplexing option of the plurality of multiplexing options for performing RB mapping when the RB has the multiplexing option.
Step 408: End.

Therefore, according to the process 40, when the user equipment operates in the CELL_DCH state, the embodiment of the present invention determines whether the RB of the user equipment has one of the plurality of multiplexing options, and uses a multiplexing mode corresponding to a multiplexing option of the plurality of multiplexing options for performing RB mapping when the RB has the multiplexing option. In other words, when the RB has a multiplexing option, the embodiment of the present invention directly use a multiplexing mode corresponding to the multiplexing option for RB mapping, and does not use multiplexing modes corresponding to other multiplexing options. In such a situation, the embodiment of the present invention can ensure that the user equipment uses a proper multiplexing mode, so as to enhance transmission efficiency.

In the process 40, when the RB has a multiplexing option, the embodiment of the present invention uses a multiplexing mode corresponding to the multiplexing option for RB mapping. Therefore, preferably, when the RB has a multiplexing option, the embodiment of the present invention no longer determines whether the RB has another multiplexing option. In such a situation, the embodiment of the present invention can prevent the user equipment from performing redundant decision steps, such as Step 122 shown in FIG. 1, so that the operating efficiency of the user equipment can be enhanced. In addition, if the RB does not have any of the multiplexing options, the embodiment of the present invention preferably does not use any multiplexing mode.

In the prior art, a decision step (Step 122 in FIG. 1) must be performed, whether the RB has a specified multiplexing option or not. In comparison, through the process 40, the embodiment of the present invention uses a multiplexing mode corresponding to a multiplexing option for RB mapping when the RB has the multiplexing option, and does not use other multiplexing modes. Therefore, the embodiment of the present invention can ensure that the user equipment can use the proper multiplexing mode for RB mapping, so as to enhance transmission efficiency.

Figure 5:
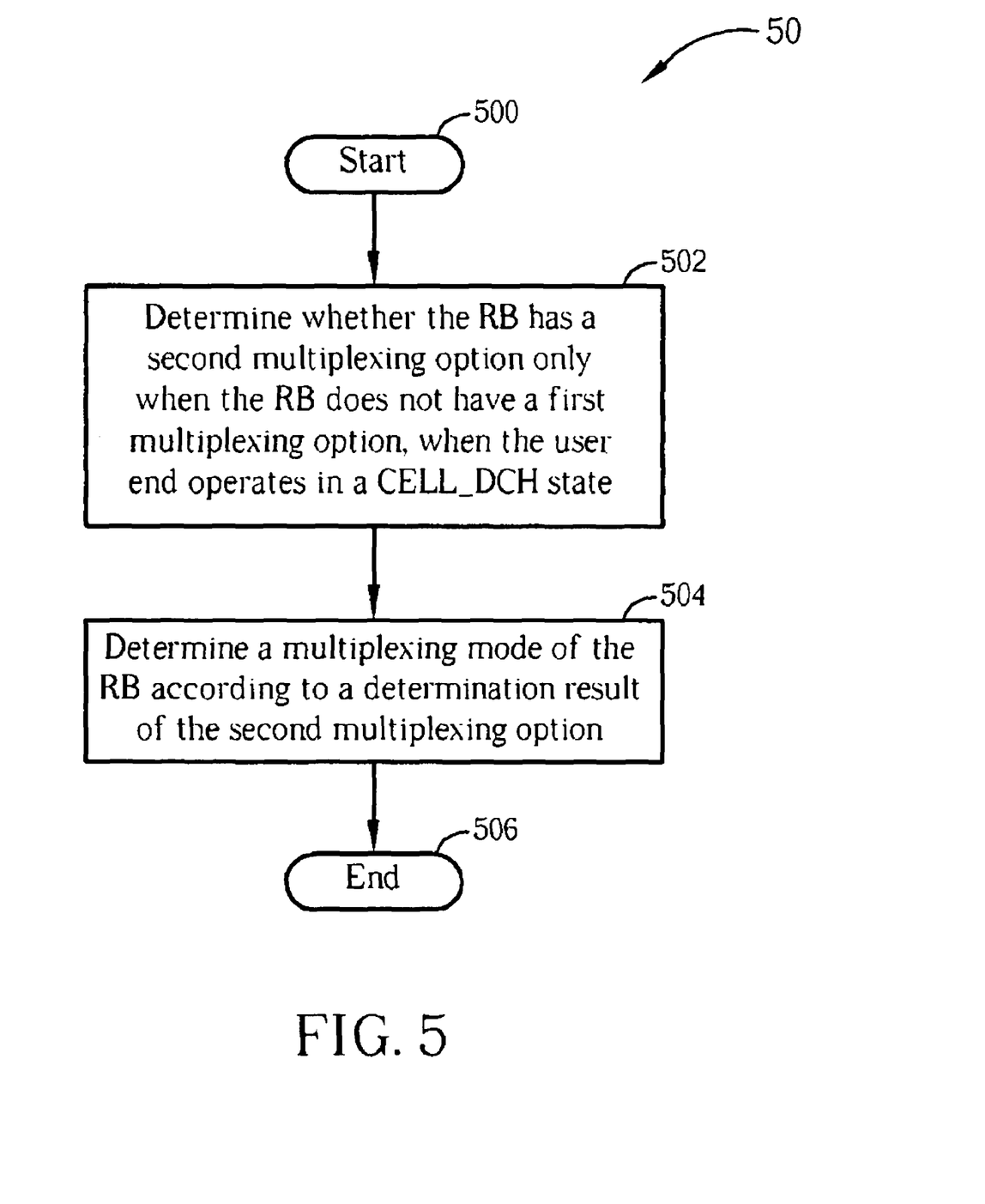
FIG. 5 is a flowchart diagram of a process according to an embodiment of the present invention.

Please refer to FIG. 5, which illustrates a schematic diagram of a process 50 in accordance with an embodiment of the present invention. The process 50 is utilized for determining a multiplexing mode of a radio bearer in a user equipment of a wireless communications system, and can be compiled into the RB mapping program code 320. The process 50 comprises the following steps:

Step 500: Start.
Step 502: Determine whether the RB has a second multiplexing option only when the RB does not have a first multiplexing option, when the user equipment operates in a CELL_DCH state. The first multiplexing option is a multiplexing option with a transport channel type "DCH" for the DL, and with a transport channel type "E-DCH" for the UL, and The second multiplexing option is a multiplexing option with a transport channel type "DCH" for the DL, and with a transport channel type "DCH" for the UL.
Step 504: Determine a multiplexing mode of the RB according to a determination result of the second multiplexing option.
Step 506: End.

According to the process 50, when the user equipment operates in the CELL_DCH state, the embodiment of the present invention checks if the RB has the second multiplexing option only when the RB does not have the first multiplexing option. That is, only when the FDD RB does not have a multiplexing option with a transport channel type "DCH"

for the DL, and with a transport channel type "E-DCH" for the UL, the embodiment of the present invention checks if the RB has a multiplexing option with a transport channel type "DCH" for the DL, and with a transport channel type "DCH" for the UL, and determines a multiplexing mode for the RB accordingly.

Preferably, when the RB has the first multiplexing option, the embodiment of the present invention does not check if the RB has the second multiplexing option, and does not determine the multiplexing mode according to the determination result of the second multiplexing option. In such a situation, when the RB has the first multiplexing option, since the embodiment of the present invention does not check if the RB has the second multiplexing option, the determination result of the second multiplexing option will not affect the multiplexing mode of the RB. As a result, the user equipment can use a proper multiplexing mode, so as to reach a better transmission efficiency. Furthermore, in Step 504, if the RB has the second multiplexing option, the embodiment of the present invention can set the RB to have a transport channel type "DCH" for the DL and UL. Oppositely, if the RB does not have the second multiplexing option, the embodiment of the present invention does not set the multiplexing mode for the RB.

As mentioned above, the prior art (Step 122 in FIG. 1) always checks if the RB has a multiplexing option with a transport channel type "DCH" for the DL, and with a transport channel type "DCH" for the UL, and determines the multiplexing mode for the RB accordingly. In comparison, only when the RB does not have the multiplexing option with a transport channel type "DCH" for the DL, and with a transport channel type "E-DCH" for the UL, the embodiment of the present invention checks if the RB has the multiplexing option with a transport channel type "DCH" for the DL, and with a transport channel type "DCH" for the UL, and determines the multiplexing mode for the RB accordingly. Therefore, the embodiment of the present invention does not have to perform redundant steps, such as Step 122, to ensure that the user equipment uses a proper multiplexing mode, so as to enhance transmission efficiency.

Figure 6:
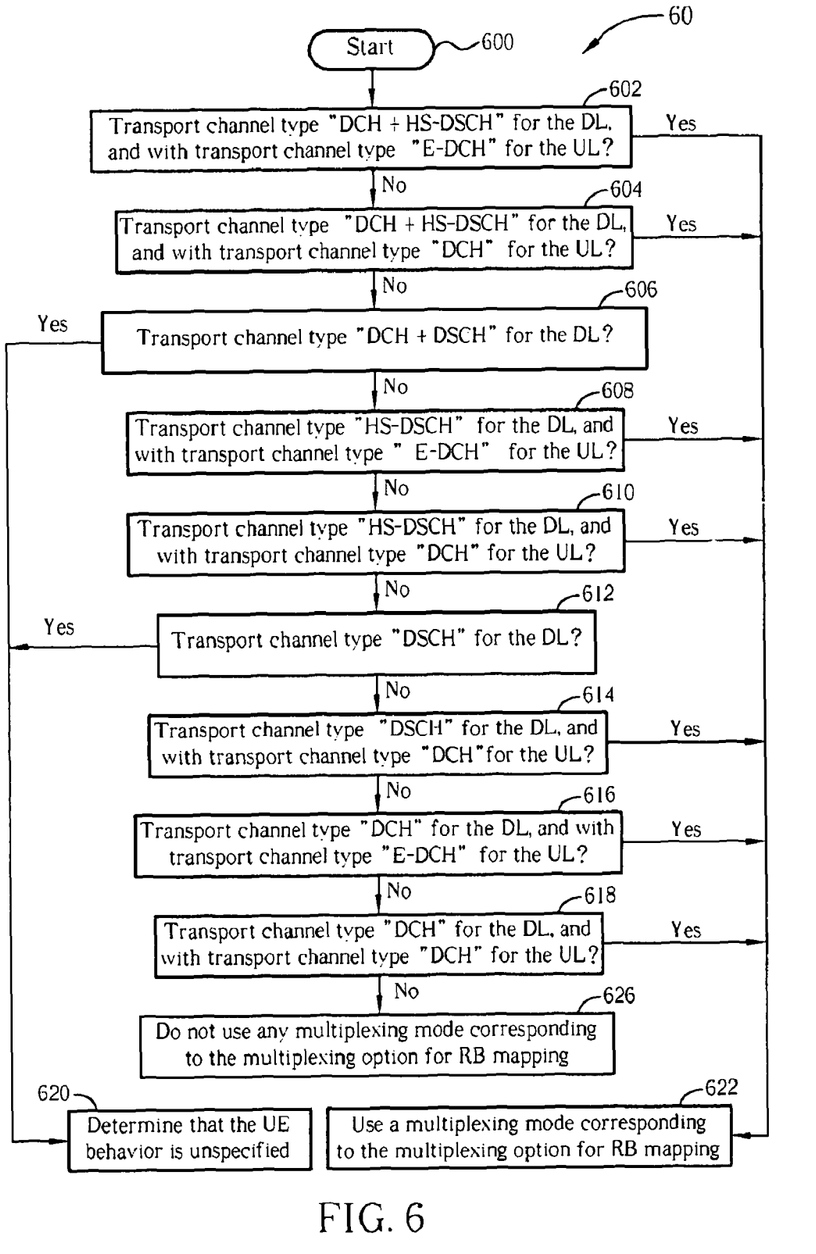
FIG. 6 is a schematic diagram of a multiplexing option selection process in accordance with an embodiment of the present invention.

The processes 40 and 50 are embodiments of the present invention, and those skilled in the art can make alternations. For example, please refer to FIG. 6, which illustrates a schematic diagram of a multiplexing option selection process 60 in accordance with an embodiment of the present invention. The multiplexing option selection process 60 is utilized for performing RB mapping in a user equipment of a wireless communications system, so as to determine multiplexing modes of an FDD RB. The multiplexing option selection process 60 can be complied into the RB mapping program code 320, and comprises the following steps:

Step 600: Start.
Step 602: Determine whether the FDD RB has a multiplexing option with transport channel type "DCH+HS-DSCH" for the DL, and with transport channel type "E-DCH" for the UL. If true, go to Step 622; else, go to Step 604.
Step 604: Determine whether the FDD RB has a multiplexing option with transport channel type "DCH+HS-DSCH" for the DL, and with transport channel type "DCH" for the UL. If true, go to Step 622; else, go to Step 606.
Step 606: Determine whether the FDD RB has a multiplexing option with transport channel type "DCH+DSCH" for the DL. If true, go to Step 620; else, go to Step 608.
Step 608: Determine whether the FDD RB has a multiplexing option with transport channel type "HS-DSCH" for the DL, and with transport channel type "E-DCH" for the UL. If true, go to Step 622; else, go to Step 610.
Step 610: Determine whether the FDD RB has a multiplexing option with transport channel type "HS-DSCH" for the DL, and with transport channel type "DCH" for the UL. If true, go to Step 622; else, go to Step 612.
Step 612: Determine whether the FDD RB has a multiplexing option with transport channel type "DSCH" for the DL. If true, go to Step 620; else, go to Step 614.
Step 614: Determine whether the FDD RB has a multiplexing option with transport channel type "DSCH" for the DL, and with transport channel type "DCH" for the UL. If true, go to Step 622; else, go to Step 616.
Step 616: Determine whether the FDD RB has a multiplexing option with transport channel type "DCH" for the DL, and with transport channel type "E-DCH" for the UL. If true, go to Step 622; else, go to Step 618.
Step 618: Determine whether the FDD RB has a multiplexing option with transport channel type "DCH" for the DL, and with transport channel type "DCH" for the UL. If true, go to Step 622; else, go to Step 626.
Step 620: Determine that the UE behavior is unspecified.
Step 622: Use a multiplexing mode corresponding to the multiplexing option for RB mapping.
Step 626: Do not use any multiplexing mode corresponding to the multiplexing option for RB mapping.

Comparing the multiplexing option selection process 60 in FIG. 6 with the multiplexing option selection process 10 in FIG. 1, the multiplexing option selection process 60 performs Steps 620, 622, or 626 according to results of Steps 602 to 618, and after performing Steps 620, 622, or 626, the multiplexing option selection process 60 no longer performs any decision steps. In comparison, the multiplexing option selection process 10 must perform Step 122, whether the FDD RB has one of the multiplexing options mentioned in Steps 102 to 116, and performs RB mapping accordingly. Therefore, the multiplexing option selection process 60 shown in FIG. 6 can ensure that the user equipment uses the proper multiplexing mode, so as to enhance transmission efficiency.

In summary, the embodiment of the present invention checks if the RB has a multiplexing option with a transport type "DCH" for the DL/UL only when the RB does not have a multiplexing option with a transport type "DCH" for the DL, and with a transport type "E-DCH" for the UL, and determines the multiplexing mode for the RB accordingly. Therefore, the present invention does not perform redundant steps, to ensure that the user equipment uses the proper multiplexing mode and enhance transmission efficiency accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a multiplexing mode of a radio bearer in an user equipment of a wireless communications system comprising:
   determining whether the radio bearer (RB) has a first multiplexing option only when the RB does not have a third multiplexing option, when the user equipment operates in a Cell Dedicated Channel state;
   determining whether the RB has a second multiplexing option only when the RB does not have the first multiplexing option after determining whether the RB has the first multiplexing option when the RB does not have the third multiplexing option; and determining and selecting a multiplexing mode of the RB according to a determination result of the first, second and third multiplexing options;

wherein the first multiplexing option is a multiplexing option with a transport channel type "Dedicated Channel" for the downlink, and with a transport channel type "Enhanced Dedicated Transport Channel" for the uplink;

wherein the second multiplexing option is a multiplexing option with a transport channel type "Dedicated Channel" for the downlink, and with a transport channel type "Dedicated Channel" for the uplink;

wherein the third multiplexing option is a multiplexing option with a transport channel type "Dedicated Channel and High Speed Downlink Shared Channel" for the downlink, and with a transport channel type "Enhanced Dedicated Transport Channel" for the uplink.

2. The method of claim 1, wherein determining the multiplexing mode of the RB according to the determination result of the first, second and third multiplexing options comprises setting the multiplexing mode to be the RB having a transport channel type "Dedicated Channel" for the downlink, and a transport channel type "Dedicated Channel" for the uplink when the determination result of the first, second and third multiplexing options is the RB has the second multiplexing option.

3. The method of claim 1, wherein determining the multiplexing mode of the RB according to the determination result of the first, second and third multiplexing options comprises not setting the multiplexing mode for the RB after determining whether the RB has the second multiplexing option and the determination result is the RB does not have the second multiplexing option.

4. A communications device of a wireless communications system utilized for accurately determining a multiplexing mode of a radio bearer comprising:
   a control circuit for realizing functions of the communications device;
   a central processing unit installed in the control circuit for executing a program code to operate the control circuit; and
   a memory coupled to the central processing unit for storing the program code;
   wherein the program code comprises:
   code for determining whether the radio bearer (RB) has a first multiplexing option only when the RB does not have a third multiplexing option, when the user equipment operates in a Cell Dedicated Channel state;
   code for determining whether the RB has a second multiplexing option only when the RB does not have the first multiplexing option after determining whether the RB has the first multiplexing option when the RB does not have the third multiplexing option; and
   code for determining and selecting a multiplexing mode of the RB according to a determination result of the first, second and third multiplexing options;

wherein the first multiplexing option is a multiplexing option with a transport channel type "Dedicated Channel" for the downlink, and with a transport channel type "Enhanced Dedicated Transport Channel" for the uplink;

wherein the second multiplexing option is a multiplexing option with a transport channel type "Dedicated Channel" for the downlink, and with a transport channel type "Dedicated Channel" for the uplink;

wherein the third multiplexing option is a multiplexing option with a transport channel type "Dedicated Channel and High Speed Downlink Shared Channel" for the downlink, and with a transport channel type "Enhanced Dedicated Transport Channel" for the uplink.

5. The communications device of claim 4, wherein code for determining the multiplexing mode of the RB according to the determination result of the first, second and third multiplexing options comprises setting the multiplexing mode to be the RB having a transport channel type "Dedicated Channel" for the downlink, and a transport channel type "Dedicated Channel" for the uplink when the determination result of the first, second and third multiplexing options is the RB has the second multiplexing option.

6. The communications device of claim 4, wherein code for determining the multiplexing mode of the RB according to the determination result of the first, second and third multiplexing options comprises not setting the multiplexing mode for the RB after determining whether the RB has the second multiplexing option and the determination result is the RB does not have the second multiplexing option.

7. The method of claim 1, wherein determining the multiplexing mode of the RB according to the determination result of the first, second and third multiplexing options comprises setting the multiplexing mode to be the RB having a transport channel type "Dedicated Channel" for the downlink, and a transport channel type "Enhanced Dedicated Transport Channel" for the uplink when the determination result of the first, second and third multiplexing options is the RB has the first multiplexing option.

8. The method of claim 1, wherein determining the multiplexing mode of the RB according to the determination result of the first, second and third multiplexing options comprises setting the multiplexing mode to be the RB having a transport channel type "Dedicated Channel and High Speed Downlink Shared Channel" for the downlink, and a transport channel type "Enhanced Dedicated Transport Channel" for the uplink when the determination result of the first, second and third multiplexing options is the RB has the third multiplexing option.

9. The communications device of claim 4, wherein code for determining the multiplexing mode of the RB according to the determination result of the first, second and third multiplexing options comprises setting the multiplexing mode to be the RB having a transport channel type "Dedicated Channel" for the downlink, and a transport channel type "Enhanced Dedicated Transport Channel" for the uplink when the determination result of the first, second and third multiplexing options is the RB has the first multiplexing option.

10. The communications device of claim 4, wherein code for determining the multiplexing mode of the RB according to the determination result of the first, second and third multiplexing options comprises setting the multiplexing mode to be the RB having a transport channel type "Dedicated Channel and High Speed Downlink Shared Channel" for the downlink, and a transport channel type "Enhanced Dedicated Transport Channel" for the uplink when the determination result of the first, second and third multiplexing options is the RB has the third multiplexing option.

* * * * *